United States Patent Office 3,484,745
Patented Dec. 16, 1969

3,484,745
DATA-TRANSMISSION SYSTEM
Roger P. Sourgens, Bourg-la-Reine, France, assignor to Societe d'Applications Generales d'Electricite et de Mecanique, Paris, France, a French company
Filed June 26, 1967, Ser. No. 648,892
Claims priority, application France, June 29, 1966, 67,480
Int. Cl. H04l 1/18, 1/10
U.S. Cl. 340—146.1                                    4 Claims

ABSTRACT OF THE DISCLOSURE

A data-transmission system with double code checking and automatic error correction is disclosed. Among the bits of each combination of the code, the number of those of a given binary value is of a predetermined parity, odd or even, and in each combination the number of mutations, i.e. the transitions from one binary value to the other, is a predetermined number. The reception device comprises means for checking said predetermined number of mutations, means for checking said predetermined parity and means for signaling any error found. The transmission device comprises means for storing the last N characters transmitted, the number N being a function of the maximum go and return transmission time, and means for repeating the transmission of the N stored characters in response to each error signal.

---

The present invention relates to a system for the transmission of coded information with code checking and automatic error-correction.

Telegraphic or data-transmission systems are known using an error-detecting code wherein the errors in transmission are detected by the receiver through a check of each character relating either to the parity in the number of bits having a given polarity or to the ratio between the number of bits of each polarity, the detection of an error causing the receiver to send an automatic repetition-control signal to the transmitter.

In particular, a telegraphic transmission system is known through U.S. Patent No. 3,439,327 issued Apr. 15, 1969, in the name of the present applicant and assigned to the same assignee as the present application, using a code of the p out of n type wherein the information-carrying element is not an element of positive or negative current with a duration equal to a unit interval but a reversal of polarity or mutation thus enabling a check to be effected at the input to the receivers before any actual telegraphic analysis function.

Nevertheless, when such a device is used over channels in which rapid variations in the transmission time appear, particularly over radio channels with serve disturbance, it has the disadvantage of being misled in the event of a displacement of mutuations appearing inside the telegraphic characters without the characteristic relationship provided by the code being modified as a result.

On the other hand, apart from the sudden variations in transmission, the manifestations of which are noticeable inside the characters, the progressive variations which are found in certain cases such as association with missiles or by means of satellites, are capable of introducing an added difficulty into the problems of automatic error correction.

Certain accidents of working may likewise mislead the automatic error-correcting system. The most inconvenient ones include the temporary interruption of the forward transmission channel, that of the return channel, the simulation of the error signal over the forward transmission channel, the simulation of the error signal over the return channel or both these simulations simultaneously.

The main object of the invention is to remedy the effects of variations in propagation of any kind.

One feature of the transmission system of the invention is that it is based on the use of a double error-detecting code in which the characters comprise a number of mutations corresponding to a code of the p out of n type and a number of bits with a given polarity having a given parity.

For example, in a specific embodiment of the transmission system of the invention, the characters retained are the thirty-eight characters of seven bits which comprise four mutations and an even number of bits having a given polarity.

Another feature of the transmission system of the invention is that it comprises, at the receiving end, the means for checking, before any recording or printing function, the predetermined number of mutations in each character and, after reconstitution of each telegraphic combination, the parity of the number of bits of a given polarity, and means of signalling any error found to the transmitting station; and at the transmission end, means for storing the last N characters transmitted, the number N being fixed depending on the maximum go and return propagation time liable to be encountered in the connection to be served, means for detecting the error signals originating from the receiver and means for repeating the transmission of the N stored characters in response to each error signal.

Another feature of the transmission system according to the invention is that the transmitter comprises means for causing the retransmission of the stored N characters to take place through the transmission of a special supplementary start-of-retransmission character, hereinafter called RQ character, and means for inhibiting its error-signal detecting means during the transmission of the RQ character and the retransmission of the N stored characters.

Another feature of the transmission system of the invention is that the receiver comprises means for recording the characters received correctly, means for blocking the input of said recording means for $N+1$ characters whenever it detects an error, means for detecting the RQ character, means for subordinating the release of the input of said recording means to the reception of the RQ character and means for transmitting a fresh error signal when it has not detected the RQ signal during a period of blocking of the input of said recording means.

These features and the advantages resulting therefrom will be better understood on reading the following description and examining the accompanying drawings in which FIG. 1 is a block diagram of a transmission system according to the invention;

Figure 1:
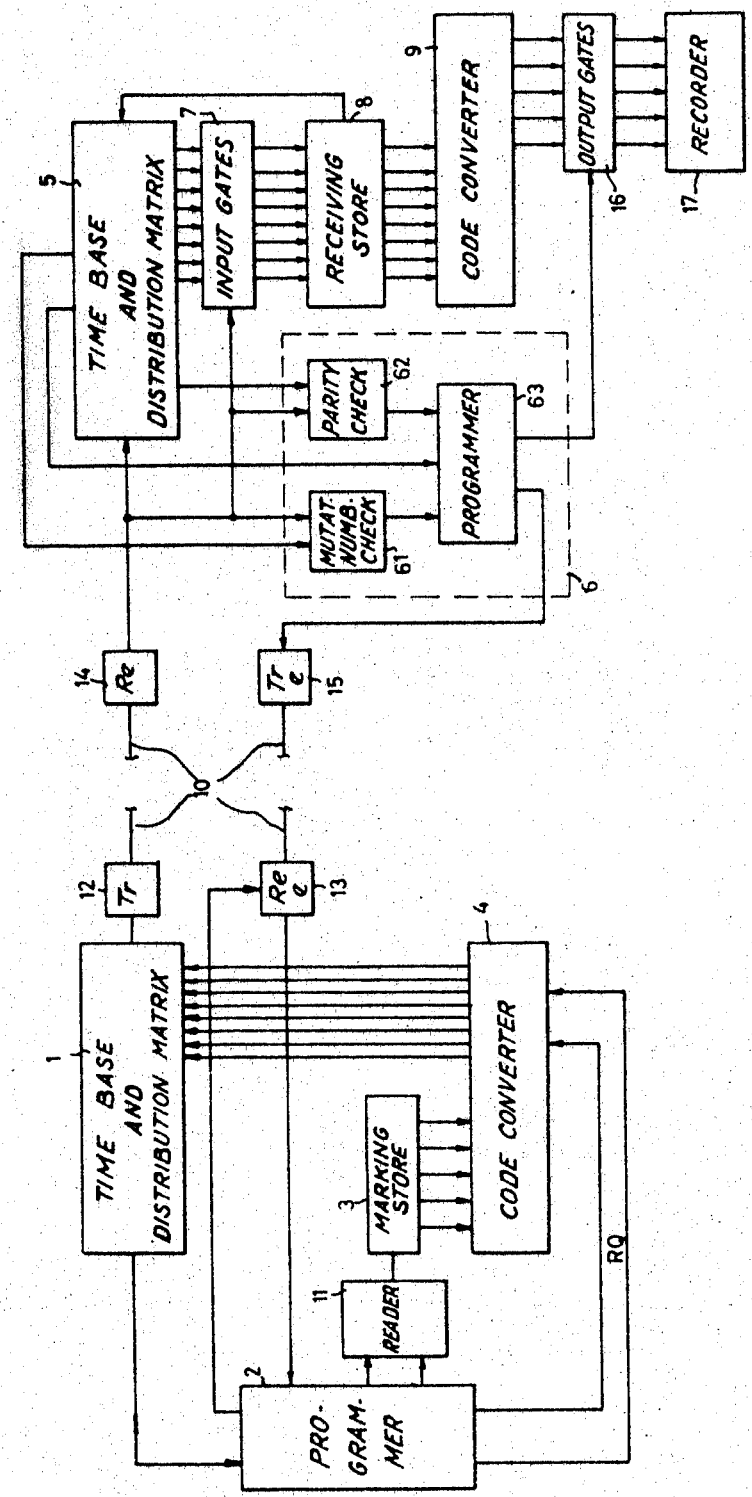

The basic diagram of FIG. 1 shows a transmission device and a receiving device interconnected by a transmission channel 10 represented, by way of example, in the form of a two-wire telegraph channel but which may be a voice-frequency telegraph channel or a radio link, as well as a single-wire connection, as will be seen later.

The transmission device is illustrated, still by way of non-limiting example, as being associated with a repetitive data source 11 such as a tape reader capable of travelling backwards through a given number of steps and immediately resuming its reading in the normal direction, in response to a control signal.

The transmission device comprises a time base 1, a transmitter 12, an error-signal receiver 13, a programmer 2 controlling, in particular, the reader 11, a marking store 3 and a code converter 4.

The time base 1 distributes clock pulses to the programmer 2 and, by means of a distribution matrix, to the transmitter 12. The receiver 13 transmits directly to the programmer 2 the error signals which it receives from the receiving device over the channel 10 except when an inhibit signal is applied thereto by the programmer 2. This, which receives on the one hand the clock pulses from the time base 1, on the other hand the error signal from the receiver 13, applies stepping pulses and a reverse running instruction to the reader 11. The stepping pulses are at a rapid rate for reverse travel, for example 25 steps per second and at normal rate for forward travel, for example 6.25 steps per second. The reverse running control signal is a permanent current during the time which the reverse running has to last. The programmer 2 further controls the transmission of a "start" signal at the beginning of transmission and the transmission of the RQ signal on the arrival of an error signal, and the inhibition of the receiver 13 until the end of repetition.

The marking store 3 comprises as many unit stores as the input code used comprises bits. Since this code is assumed to have five bits, the marking store 3 comprises five trigger circuits which are re-set at the zero moment in each cycle and set immediately after each forward step of the reader.

The code converter 4 is a static code converter with diodes which is fed on the one hand by the marking store 3, on the other hand through the programmer 2 for the "start" and "RQ" signals and which biases four of its eight output bars to form a parallel code combination which is converted into a serial code combination by the clock pulses supplied by the time base 1.

The receiving device comprises a time base and distribution matrix 5, a receiver 14, an error-signal transmitter 15, a checking and programming unit 6, a receiving store 8, the input of which is controlled by a set of gates 7, and a code converter 9 serving a recording device 17 such as a recording store of a teleprinter or a perforator, by means of a set of gates 16.

The time base 5 and its distribution matrix are constituted on the same principle as the time base and distribution matrix 1 of the transmission device but further comprise conventional devices for rejecting false starts and for synchronisation with the incoming modulation.

The unit 6 comprises a device 61 for checking the number of mutations, a device 62 for checking the parity in the number of bits of a given polarity resulting from the sampling of the incoming signal and a programmer 63. The checking device 61 counts the mutations observed in each incoming combination by means of counting pulses which it receives from the time base 5. It is reset at the beginning of each cycle of the time base 5 and it supplies a pulse to the programmer 63 when the number of mutations appearing in a cycle is other than 4.

The set of gates 7 receives, on the one hand the pulses leaving the receiver 14, each of which corresponds to a mutation in the incoming modulation and, on the other hand, from the time base 5 the clock pulses during which the successive mutations in each combination should appear, this latter information enabling the pulses to be directed towards the eight unit stores of the receiving store 8 and hence a conversion from a serial modulation to parallel information.

The receiving store 8 feeds, on the one hand, the code converter 9 which translates the information received therefrom into five-unit code combinations, and on the other hand the parity-check device 62 which checks whether the bits of a given polarity, for example negative, recorded in the store 8 are even in number and supplies a pulse to the programmer 63 in the opposite case.

The programmer 63 receives clock pulses from the time base 5 as well as the error pulses from the checking circuits 61 and 62. When it receives one of these error pulses, it blocks the set of gates 16 for a given number of cycles of the time base 5 and transmits an error signal over the transmission channel 10 by means of the transmitter 15.

Figure 2:
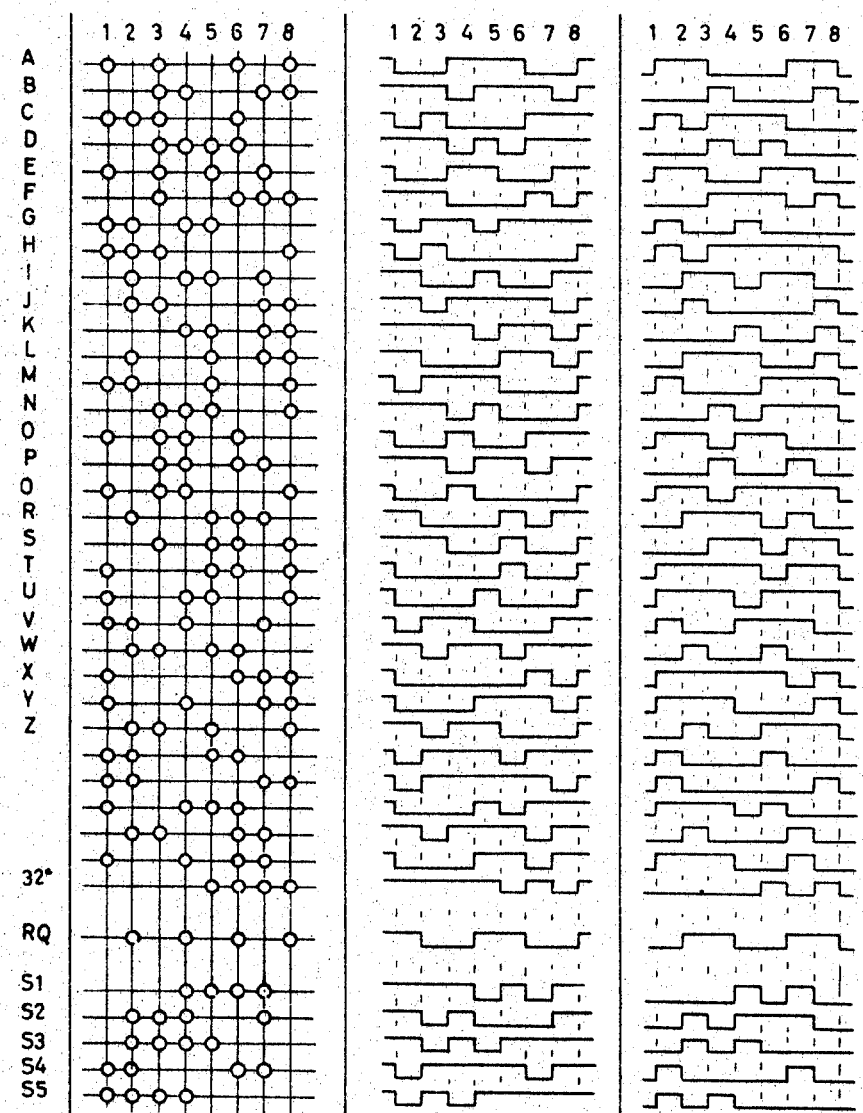
FIG. 2 shows an example of a double error-detecting code alphabet adapted to the transmission system of FIG. 1.

FIG. 2 shows an example of an alphabet suitable for the transmission system of FIG. 1. This alphabet (Table A) is composed of the thirty-eight combinations of four actual mutations out of eight possible mutations which produce telegraph signals composed of seven bits having an even number of positive bits (Table C) or negative bits (Table B) according to whether the initial mutation of each character is in the direction from a negative bias towards a positive bias (Table C) or in the opposite direction (Table B).

Of these thirty-eight combinations, the first thirty-two correspond to those of the International Alphabet No. 2 and the thirty-third is used as what is called the RQ signal adapted to precede each repetition. The last five combinations designated $S_1$ to $S_5$ are available and may be used as switching signals.

Since this alphabet is intended for use with synchronous transmission, a start-of-message combination or "START" signal is either selected from the available combinations having a mutation at the first possible point for mutation in such a manner as to start the receiving time base 5 from this first mutation, or selected systematically outside the rules, for example comprising eight mutations in order to facilitate synchronisation of the time base 5 of the receiving device with the time base 1 of the transmission device. In this case, the receiver indicates by an immediate error signal that it is indeed in order for reception.

At the beginning, the transmission device transmits the "START" signal independently of the reader 11, then effects a code conversion in accordance with FIG. 2 on the basis of the five-unit combinations read by the reader and transmits combinations in accordance with Table B of the code for example over the channel 10. If the start signal is one of the combinations in FIG. 2, for example the combination $S_4$, the receiver normally receives it but since it is a question of a functional signal it does not give rise to any output signal from the code converter 9 and is not transferred to the recorder 17, whereas the following characters are normally recorded if they are free of error.

When an error pulse revealing a number of mutations other than 4 or an error in parity is applied to the programmer 63, this blocks the set of gates 16 and sends an error signal over the channel 10 by means of the transmitter 15. In the case of a two-wire transmission channel 10, the error signal may consist in the transmission of a marking current, that is to say negative in the case where the signals of Table B are used, having a relatively short duration, for example 80 milliseconds. In the case of a single-wire transmission channel, this signalling current should have a duration at least equal to that of a character plus half a unit interval, for example at least 170 milliseconds.

As soon as the error signal is received, the programmer 2 of the transmission device starts the reverse running of the reader at high speed, for example by one step every thirty milliseconds, for a number N of steps which is a function of the go and return transmission time, then, immediately after the character being transmitted, it causes the transmission of the RQ character followed by the repetition of the last N characters transmitted and the inhibition of the receiver 13 until the end of this repetition following which the transmission continues without interruption unless there is a fresh error signal. At the receiving end the release of the set of gates 16 is postponed for N+1 cycles of the time base, that is to say during N+1 characters and subordinated to the reception of the RQ signal failing which a fresh error signal is transmitted and the blocking of the set of gates 16 maintained for a fresh period of N+1 characters. Furthermore, the reception of a RQ signal outside a period when the set of gates 16 is blocked, initiates the same automatic process as the detection of an error. In this manner, the characters read by the reader 11 are transmitted in order, without any omission or repetition, by the set of gates 16 to the recorder 17, even under seriously disturbed conditions of transmission as will be apparent more clearly later on.

Figure 3:
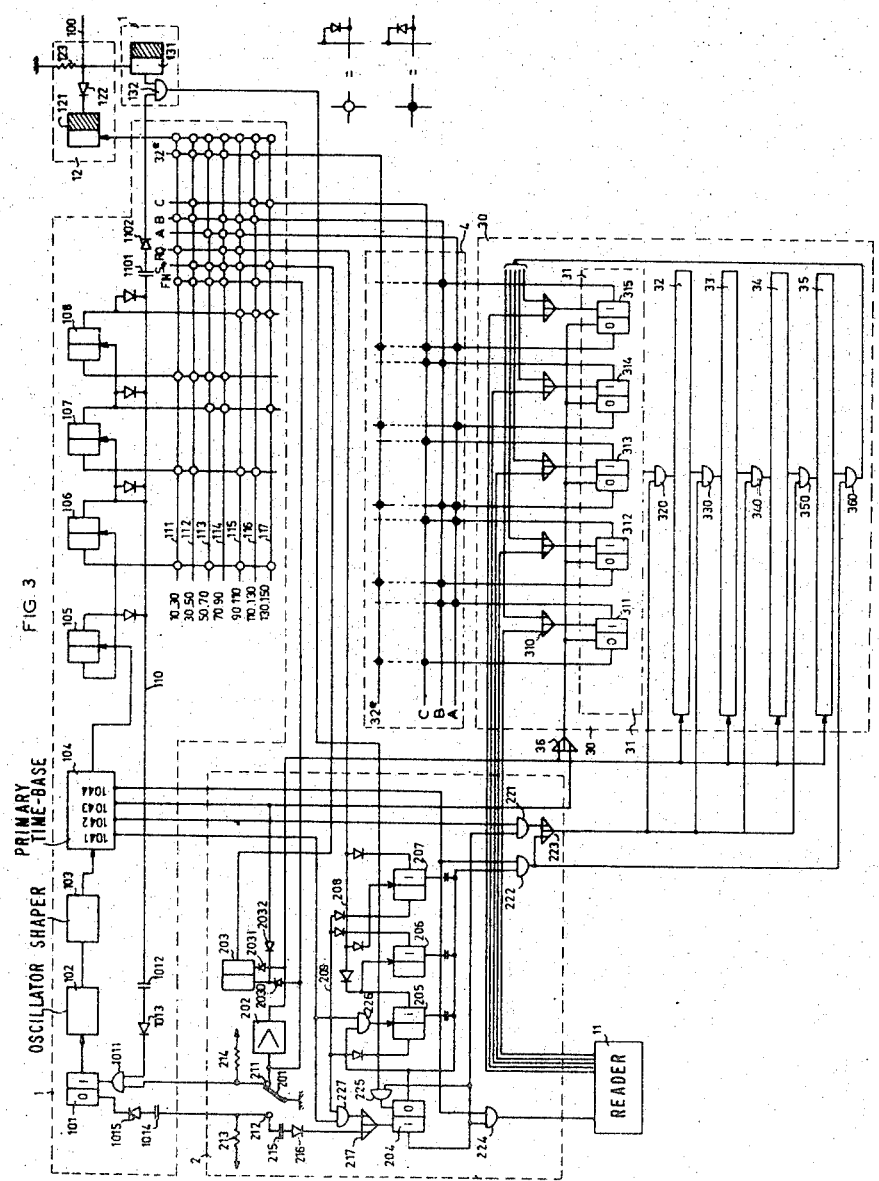
FIG. 3 shows schematically an example of an embodiment of a transmission device according to the invention.

FIG. 3 is a logical diagram of a transmission device permitting automatic working as defined above. As distinct from FIG. 1, this transmission device is illustrated by way of example as being associated with any data source assumed to be without a store which is why it comprises a central store 30, and on the other hand with a single-wire transmission channel, although these differences only introduce slight modifications and the similar members in FIGS. 1 and 3 are designated by the same reference numerals.

In FIG. 3 it will be seen that the transmitter 12 comprises a transmission relay 121 which may either be of the electro-mechanical type, or a monostable electronic trigger circuit, associated with a diode 122 and a resistor 123, and the receiver comprises a reception relay 131 which may likewise be electro-mechanical or electronic, and with which there is associated a AND-gate 132 serving to detect the error signal as will be seen later. The units 12 and 13 are connected to a single line 100 with outgoing single-current working, the voltages being assumed to be either substantially zero or negative, by way of example.

The unit 1 consisting of the time base and the associated distribution matrix comprises a trigger circuit 101 for the blocking and release of an oscillator 102, a shaping circuit 103 converting the output signal from the oscillator 102 into control pulses, a primary time base 104, a telegraphic time base consisting of four scalers 105, 106, 107, 108, a diode matrix with seven bars 111 to 117 fed by the outputs from the scaler 105 to 108 and one bar 110 connected to the zero outputs of these by means of diodes.

The purpose of the primary time base 104 is to control the input scaler 105 of the telegraphic time base to a frequency double the telegraphic frequency used and to supply four very close successive pulses through four outputs 1041 to 1044 which pulses immediately precede the zero moment of the telegraphic cycle and consequently do not appear until the end of the first cycle.

In a conventional manner, the scaler 106 is controlled by the one output of the scaler 105 and each of the scalers 107, 108 is controlled by the zero output of the preceding scaler in such a manner that the duration of the telegraphic cycle comprises eight time units, for example, 20 milliseconds for a transmission speed of 50 bauds or 5 milliseconds for a speed of 200 bauds.

Figure 4:
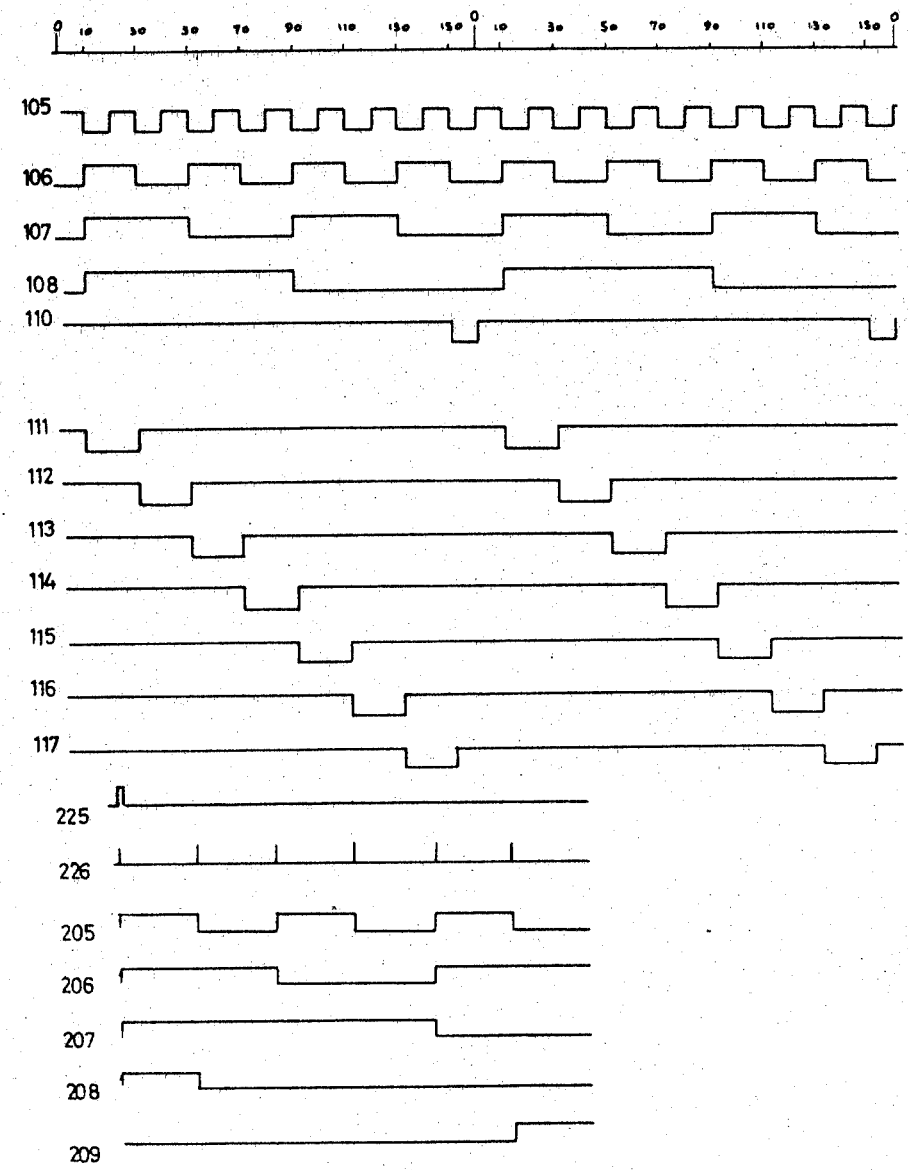
FIG. 4 is an explanatory diagram of the operation of the transmission device of FIG. 3.

FIG. 4 shows the state of the trigger circuits 105 to 108 and the polarities applied thereby to the bars 110 and 111 to 117 during two consecutive telegraphic cycles. The bar 110 is constantly positive except during a square pulse lasting from the moment 150 in each telegraphic cycle to the zero moment in the following cycle. The positive pulse thus appearing at the zero moment in each cycle is applied to one input of an AND-gate 1011 by means of a capacitor 1012 and a diode 1013 and to the input of the gate 132 by means of a capacitor 1101 and a diode 1102. The gate 1011 controls the input setting the trigger circuit 101 in the position for blocking the oscillator 102. It is controlled by the programmer 2 and is only passing when this is in the stopped position.

The operation of the trigger stages 105 to 108 determines, at each of the bars 111 to 117, a negative square pulse of twenty milliseconds, from the moment 10 to the moment 30 ms. of each cycle for the bar 111, from the moment 30 to the moment 50 ms. for the bar 112 and so on up to the moment 130 to 150 ms. for the bar 117. Since each of the bars 111 to 117 is connected to the operating input of the transmission relay 121 through a diode, these square pulses which follow one another without interruption from the moment 10 to the moment 150 in each cycle tend to provide a uniformly negative modulating voltage. Nevertheless, the bars 111 to 117 are also connected through diodes to the code-conversion matrix 4 which maintains a positive potential at some of these bars as a function of the state of the central store 30 and finally only allows the negative square pulses necessary to constitute the output modulation in accordance with Table B in FIG. 2 to be formed. The operation of the monostable trigger stage 121 through the application of a continuous negative signal to its input brings the cathode of the diode 122 to a negative potential and causes a current to pass through the resistor 123 and the diode 122 in series in such a manner that a negative voltage corresponding to the potential drop in the resistor 123 is applied to the line 100. In the absence of a negative signal at the input of the trigger stage 121, the cathode of diode 122 is substantially at earth potential and the same applies to line 100.

The programmer 2 comprises essentially an on-off switch 201 which may be remote-controlled, a clearing amplifier 202 for the central store 30, a marking trigger circuit 203 for the "START" signal, a trigger stage 204 determining the normal or repetition operation and a counter composed of three trigger stages 205, 206, 207 serving two matrix bars 208, 209.

In the off position, the switch 201 connects to earth a terminal 211 which is connected to a negative source through a resistor 214 and in the on position it connects to earth a terminal 212 connected to the negative source through a resistor 213. The terminal 211 is connected to the second input of the gate 1011 which it unblocks when it is connected to earth, to the resetting input of the trigger circuit 203 by means of a diode 2030 for maintaining trigger 203 at rest, to the input of the amplifier 202 and, by means of diodes orientated in such a manner as to transmit earth potential thereto, to the bars 111, 112, 113, 114 and 116 which produces the thirty-second combination, in accordance with Table B of FIG. 2, used as an end signal by way of example.

The output of the amplifier 202 is connected to the general clearing input of the central store 30 and, by means of a diode 2031, to the setting input of the trigger circuit 203. The one output of the trigger circuit 203 is connected to the distribution matrix of the time base 1 by means of diodes in such a manner as to control the modulation of the "START" combination. If this is the signal $S_4$ for example in the Table B in FIG. 2, the one output of the trigger circuit 203 is connected to the bars 112, 113, 114, 115 and 117. The re-set input of the trigger circuit 203 is further connected to the output 1043 of the auxiliary time base 104 by means of a diode 2032.

The terminal 212 is connected, by means of a capacitor 1014 and a diode 1015 to the input of the trigger circuit 101 restoring it to the position in which the oscillator 102 is unblocked, by means of a capacitor 215, a diode 216 and an OR-gate 217 to the setting input of the trigger circuit 204, to set said trigger in the position for normal transmission. In this position, the trigger circuit 204 unblocks an AND-gate 221, the second input of which is connected to the output 1042 of the auxiliary time base 104, blocks an AND-gate 222, the second input of which is connected to the output 1044 of the auxiliary time base 104 and unblocks, on the one hand an AND-gate 224, the second input of which is connected to the same output 1044, on the other hand an AND-gate 225, the second input of which is connected to the output of the gate 132 and the output of which is connected to the re-set input of the trigger circuit 204 corresponding to the repetition position. When it comes into this position, the trigger circuit 204 restores the three trigger circuits 205, 206, 207 to the one position, blocks the gates 221, 224, 225 and unblocks a gate 226, the second input of which is connected to the output 1041 of the auxiliary time base 104, and the output of which is connected to the input of the trigger circuit 205 which is connected as a scaler. The outputs of the trigger circuits 205, 206, 207 are connected, through diodes, to two matrix bars 208, 209 in such a manner that when all three are in the one position the bar 208 is positive and when the counter which they constitute has advanced through five steps starting from this position, the bar 209 becomes positive and unblocks an AND-gate 227, the second input of which is connected to the output 1041 of the auxiliary time base 104 and the output of which is connected to the setting input of the trigger circuit 204 by means of the gate 217. The bar 208 is connected through diodes to the bars 111, 114, 115 of the distribution matrix of the time base 1 in such a manner as to control the modulation of the "RQ" combination announcing a repetition.

The central store 30 comprises a transmission store 31 and four supplementary stores 32 to 35.

The transmission store 31 comprises five trigger circuits 311 to 315, the re-set inputs of which are connected by means of an OR-gate 36, on the one hand to the output 1043 of the auxiliary time base 104, on the other hand to the output of the amplifier 202. The set inputs of the trigger circuit 311 to 315 are connected by OR-gates 310 respectively on the one hand to the five outputs of the reader 11 and on the other hand to the outputs of a set of five output gates 360 of the last stage 35 in the central store 30. The supplementary stores 32 to 35 each comprise five trigger circuits, the re-set inputs of which are connected to the output of amplifier. The transfer of information from one of the stores 31 to 34 to the following one is effected through set of gates 320, 330, 340, 350, the unblocking inputs of which are connected in parallel to the outputs of the gates 221 and 222 by means of an OR-gate 223. The transfer of information from the store 35 to the transmission store is effected through the set of gates 360, the unblocking inputs of which are connected to the output of the gate 222. The outputs of the trigger circuit 311 to 315 are connected through diodes to an assembly 4 of thirty-two code-converting bars which are themselves connected through diodes to the bars 111 to 117 of the distribution matrix in such a manner as to constitute a modulation in accordance with Table B in FIG. 2 from information supplied by the reader 11 in five-unit binary code in accordance with the International Alphabet No. 2. In order to simplify the drawings, the diodes connecting the rows and the columns of the matrices at their crosspoints have been symbolized by a white circuit when the cathode of the diode is connected to the row and by a black circle when it is connected to the column.

FIG. 4 indicates the operation of the telegraphic time base and of the associated distribution matrix during two consecutive cycles as well as the operation of the programmer 2. At the moment that "ON" is pressed, the switch 201 leaves the contact 211 and the input of the amplifier 202 changes abruptly from earth potential to a negative voltage. A positive pulse for clearing is applied to all the stores 31 to 35. On the other hand, the trigger circuit 203 passes to the one position, positively biasing the matrix bar controlling the modulation of the "START" combination which will remain marked until the following moment 0 when the trigger circuit 203 is re-set by the auxiliary time base 104. At the same time, the gate 1011 is blocked and when the switch 201 reaches the contact 212 the bistable blocking trigger circuit 101 starts the oscillator 102 while assuming the one position.

Simultaneously the trigger circuit 204 is set to the one position in such a manner that the gate 221 is opened and will transmit the first pulse leaving the output 1042 of the auxiliary time base 104 which will control the downward transfer in the central store 30, but this first pulse can only appear at the end of the first cycle during which the START combination $S_4$ is transmitted. Referring to the diagrams in FIG. 4, it will actually be seen that the telegraphic time base only starts at the moment 10 milliseconds.

The following cycles, with normal transmission, follow one another in a uniform manner: the pulse leaving the terminal 1041 confirms the trigger circuit 204 in the normal running position, the pulse leaving the terminal 1042 controls the downward transfer in the central s ore, the pulse leaving the terminal 1043 returns the transmission store 31 to zero and confirms the trigger circuit 203 in the re-set position and the pulse leaving the terminal 1044 initiates, through the gate 224, the marking of the transmission store 31 by the reader 11 but does not pass through the gate 222 which is blocked in normal operation.

The error signalling is effected by the receiving correspondent by means of a negative transmission of a duraation at least equal to that of one character plus half a binary unit element. The transmitter effects a line test at the zero moment in its own cycle (pulse 110, FIG. 4), that is to say at a moment when the transmission trigger circuit 121 is in the normal position and the line is at earth potential in the absence of signalling from the receiving correspondent. In the case where the receiver cycle is slightly smaller than the transmitter cycle, it might happen that the transmitter did not detect the error signal if the latter had a duration equal to one character, i.e. to a receiver cycle. It is the reason for which the error signal is given a duration equal to one character plus half a binary unit element.

If the latter transmits negative current, this current blocks the diode 122 and sets the receiving trigger circuit 131. The gate 132 is open and the pulse applied to the gate 132 at the moment zero reaches the trigger circuit 204 through the gate 225. The trigger circuit 204 passes to the zero position, which initiates the repetition process illustrated by the seven last lines in FIG. 4 by the blocking of the gate 225 which will be maintained until the trigger circuit 204 is re-set to the one position and the unblocking of the gate 222 through which the pulses leaving the terminal 1044 control the downward transfer in the central store and the transfer from the store 35 to the transmission store 31 by means of the set of gates 360 in such a manner that the central store 30 circulates in a closed path.

Nevertheless, since the shifting of the store is controlled at a moment in time situated before the zero moment, this rotation begins substantially one cycle after the zero moment at which the repetition process was initiated. In the course of this cycle, the gate 224 is blocked preventing any contributions from the data source 11 and the trigger circuit 204, passing to the zero position, has set the trigger circuits 204, 206, 207 to the one position and unblocked the gate 226. The matrix bar 208 is therefore positive from the moment of the line error test and immediately controls the transmission of the RQ signal. Since the bar 208 ceases to be positive during the following cycle, the RQ signal is replaced by the transmission of the stored characters while the counter formed by the trigger circuits 205, 206, 207 advances by one step at each pulse leaving the terminal 1041 and passing through the gate 226. At the fifth step, the bar 209 becomes positive, opens the gate 227 and thus prepares the return of the trigger circuit 204 to the one position corresponding to normal traffic. This return thus takes place after the repetition of five characters following the transmission of an RQ signal.

Figure 5:
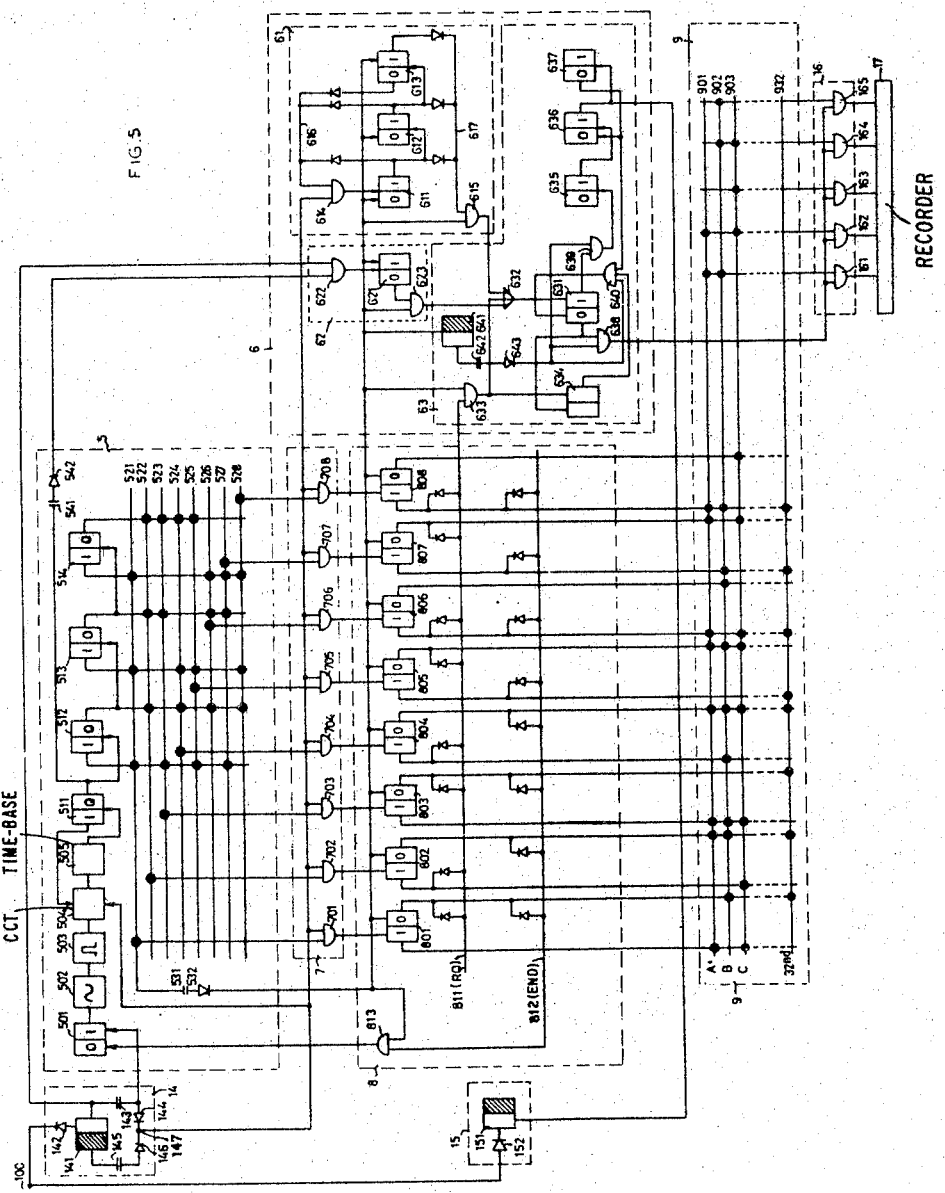
FIG. 5 shows schematically an example of an embodiment of a receiving device according to the invention.

FIG. 5 is a logical diagram of a reception device corresponding to the transmission device of FIG. 3. This reception device is therefore represented as associated with the single-wire channel 100 and does not differ in any other way from the basic diagram in FIG. 1, the reference numerals in which are repeated in FIG. 5.

The reception circuit 14 may comprise a monostable trigger circuit 141 for example, the set input of which is connected to the line 100 through a diode 142 orientated in such a manner that it is passing for the negative signals. The one output of the trigger circuit 141 is connected to an input of the parity-check device 62 and connected through a capacitor 143 on the one hand to the starting input for the time base 5, on the other hand, by means of a diode 144, to the set of gates 7 and to the device for checking the number of mutations 61. The zero output of the trigger circuit 141 is connected, by means of a capacitor 145 and a diode 146, to the same inputs of the set of gates 7 and of the device 61, the cathodes of the diodes 144 and 146 being connected together.

The time base 5 comprises a bistable trigger circuit 501, the set input of which is connected to the operated output of the trigger circuit 141 through the capacitor 143, an oscillator 502, a shaping circuit 503, a synchronization circuit 504, a primary time base 505, a telegraphic time base composed of four trigger circuits 511, 512, 513, 514 connected as scalers and a distribution matrix comprising eight matrix bars 521 to 528 fed through diodes by the outputs of the trigger circuits 512, 513, 514. Each of these diodes having its anode connected to one of the matrix bars 521 to 528 and its cathode to one output of one of the trigger circuits 512 to 514 is syymbolized in FIG. 5 by a black circle in accordance with the convention adopted in FIG. 3.

The input of trigger circuit 501 is connected to the common point 147 of diodes 144 and 146 and receives a pulse at each change of state of the trigger circuit 141, that is to say, at each mutation of the incoming signal. Trigger circuit 501 is thus turned to state one at each mutation of a given polarity and starts oscillator 502. The synchronization circuit 504 receives from the shaping circuit 503 clock pulses which the latter derives from the alternating signal supplied thereto by oscillator 502. The synchronization circuit 504 receives the mutations from 0 to 1 and vice versa of the incoming signal. Trigger 511 is driven by circuit 504 through primary time base 505 which is a frequency divider deriving from the pulses produced by 504 the signal of line 511 of FIG. 6. Synchronization circuit 504 is triggered when it receives a signal from 147 and a signal from 511 simultaneously. Consequently the signal from 511 starts at a mutation of the incoming signal and receiver time base is thus synchronized with the transmitter time base 1. The zero output of the trigger circuit 511 which controls the trigger circuit 512 is connected, through a capacitor 541 and a diode 542, to the input of the parity-check device 62. The connections of the matrix bars 521 to 528 to the outputs of the trigger circuits 512, 513, 514 are such that at every cycle, the bar 521 is positive from the moment zero to the moment 20 ms., the bar 522 from the moment 20 to the moment 40 ms. and so on, the bar 528 being positive from the moment 140 to the moment 160 ms., that is to say the zero moment of the following cycle.

The set of gates 7 comprises eight AND-gates 701 to 708 having their first inputs connected in parallel to the output of the reception circuit 14, that is to say the common point of the diodes 144 and 146 and their unblocking inputs connected, by means of diodes, to the bars 521 to 528 respectively.

The reception store comprises eight trigger circuits 801 to 808, two matrix bars 811, 812 and one AND-gate 813. The set inputs of the trigger circuits 801 to 808 are respectively connected to the outputs of the gates 701 to 708 and their re-set inputs are connected in parallel to the matrix bar 521 by means of a capacitor 531 and a diode 532. The matrix bars 811 and 812 are connected, through diodes, to the outputs of the trigger circuits 801 to 808 corresponding respectively to the RQ combination and the "end" combination. The two inputs of the gate 813 are connected, the first to the bar 521 by means of the capacitor 531 and the diode 532 and the second to the bar 812. The output of the gate 813 is connected to the re-set input of the trigger circuit 501.

The code converter 9 comprises thirty-two matrix bars 901 to 932, each of which is connected through diodes on the one hand to the outputs of the trigger circuits 801 to 808 in accordance with one of the thirty-two first combinations in the Table B of FIG. 2, and on the other hand to the set of gates 16 in accordance with the corresponding combination in the five-unit International Alphabet No. 2. The set of gates 16 comprises five AND-gates 161 to 165. The direction of the diodes constituting the crosspoints between the matrix bars 901 and 932 and, on the one hand the outputs of the trigger circuits 801 to 808, on the other hand the unblocking inputs of the gates 161 to 165, is symbolized by the same conventional dots as above. The pulse inputs of the gates 161 to 165 are fed in parallel through the programmer 63 and their outputs are connected to the data collector or recording device 17.

The circuit for checking the number of mutations comprises three trigger circuits 611, 612, 613, an input gate 614, an output gate 615 and two matrix bars 616, 617. The zero-setting or re-set inputs of the trigger circuit 611, 612 and the input for setting to the one position or set position of the trigger circuit 613 are controlled in parallel by the matrix bar 521 by means of the capacitor 531 and the diode 532, that is to say at the zero moment in each receiving cycle. The one output of the trigger circuit 611 controls the trigger circuit 612 as a scaler and is connected to the bars 616 and 617 through diodes. The one output of the trigger circuit 612 controls the trigger circuit 613 as a scaler and is connected to the bars 616, 617 through diodes. The zero output of the trigger circuit 613 is connected through a diode to the bar 616 and its one output is connected through a diode to the bar 617. The trigger circuit 611 is controlled as a scaler by the AND-gate 614, one input of which is connected to the output of the reception circuit 14 and the other to the bar 616. The AND-gate 615 has one input connected to the bar 521 through the capacitor 531 and the diode 532 and its second input connected to the matrix bar 617.

The parity-check circuit 62 comprises a trigger circuit 621, an input gate 622 and an output gate 623. The input of the trigger circuit 621 for setting it to the one position is connected to the bar 521 through the capacitor 531 and the diode 532. The AND-gate 622 controls the trigger circuit 621 as a scaler. It has two inputs, the first of which is connected to the one output of the trigger circuit 141 and the second of which is connected to the zero output of the trigger circuit 511 by means of the capacitor 541 and the diode 542. The output zero of the trigger circuit 621 is connected to one input of the AND-gate 623, the second input of which is connected to the bar 521 through the capacitor 531 and the diode 532.

The programmer 63 comprises a trigger circuit 631, the one input of which is controlled by an OR-gate 632 with three inputs, of which the first is connected to the output of the gate 615, the second to the output of the gate 623, and the third to the output of an AND-gate 633, one input of which is connected to the bar 521 through the capacitor 531 and the diode 532 and the second input of which is connected to the matrix bar 811 which is positive when the combination recorded in the store represents the character RQ. The output of the gate 633 is likewise connected to the one input of a trigger circuit 634. The one output of the trigger circuit 631 controls an AND-gate 639, the second input of which is connected to the bar 521 by means of the capacitor 531, of the diode 532 and a delay circuit consisting of a monostable trigger circuit 641, a capacitor 642 and a diode 643. The output of the gate 639 controls a counting down counter composed of three trigger circuits 635, 636, 637, the cycle of which is shortened from eight to six control pulses by a feedback from the zero output of the trigger circuit 637 to the zero input of the trigger circuit 636. The zero output of the trigger circuit 637 is further connected to one of the three inputs of an AND-gate 640, the other two inputs of which are respectively connected to the one output of the trigger circuit 634 and to the output of the delay circuit 641, 642, 643. The output of the gate 640 is connected to the zero input of the trigger circuit 631. The zero output of the trigger circuit 631 is connected, on the one hand to the zero input of the trigger circuit 634, on the other hand to one input of an AND-gate 638, the second input of which is connected to the output of the delay circuit 641, 642, 643. The output of the gate 638 supplies pulses to the five gates 161 to 165 controlling the transfer between the code converter 9 and the data collector 17. Furthermore, the one output of the trigger circuit 636 is connected to the control input of the transmitter 15 composed, for example, of a monostable trigger circuit 151 having its operated output connected to the line 100 through a diode 152.

Figure 6:
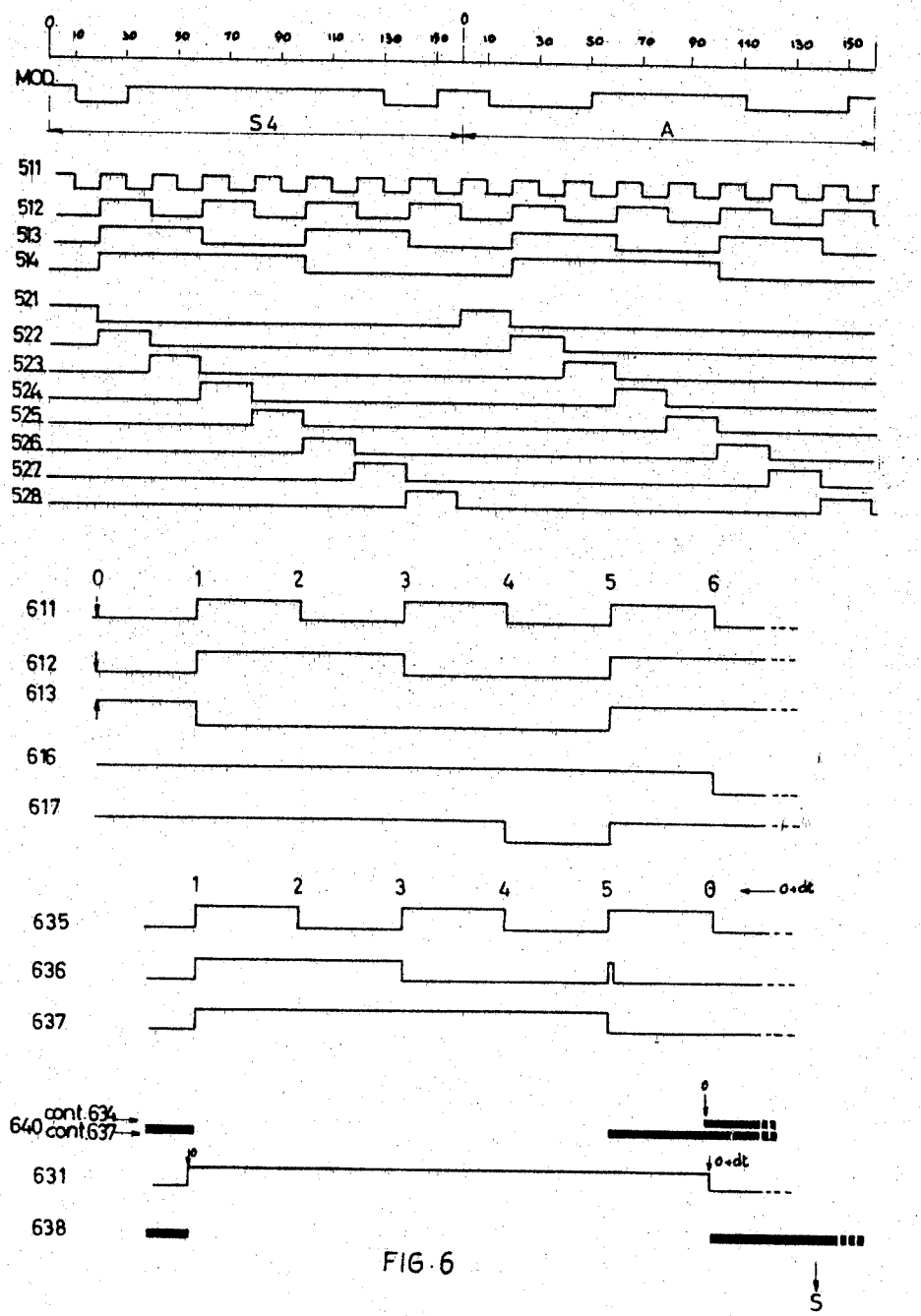
FIG. 6 is an explanatory diagram of the operation of the receiving device of FIG. 5.

The diagrams in FIG. 6 illustrate the following explanations of operation with regard to the telegraphic time base and its distribution matrix during two consecutive cycles on the one hand and the checking and programming unit 6 on the other hand.

The first mutation in the negative direction originating from the transmitter 12 sets the trigger circuit 141 to the one position. The pulse transmitted by this to the unblocking trigger circuit 501 causes it to change to the one position and starts the oscillator 502. The telegraphic time base 511–514 is fed in accordance with the diagram in FIG. 6.

The oscillator 502 and the telegraphic time base 511–514 will be in operation until the end sequence is detected by the bar 812. Since this is then positive, the positive pulse applied by the bar 521 to the gate 813 restores the trigger circuit 501 to the zero position and the oscillator 502 is immediately blocked.

In the meantime, the reception cycles follow one another. The bar 521 opens the gate 701, at each cycle, from the moment 0 to the moment 20 ms. If the relay 141 records a mutation in this period, this is represented by a common pulse applied to all the gates 7, and the corresponding recording trigger circuit 701 is set to the one position.

The bar 522, opening the gate 702 in the same manner from the moment 20 to the moment 40 ms. will direct towards the recording trigger circuit 802 any pulse corresponding to a possible mutation transmitted at the moment 30 ms. at the transmitter.

The same applies to the other bars 523 to 528 controlling the gates 703 to 708 and directing the incoming mutations towards the recording trigger circuits 801 to 808 during the periods allocated to each of them.

At the end of each cycle, at the moment 160 ms. (or 0 ms. of the following cycle), all the recording trigger circuits 801 to 808 being then in position, only one of the bars of the matrix 9 is positive. It feeds the vertical bars of the code converter in accordance with the corresponding five-unit code and as a result opens the AND-gates 16 in accordance with said code.

The pulse leaving the programmer 63, which is applied to the set of gates 16 if the signal has to be put out, then transfers the marking pulses in parallel to the data collector 17.

If this output has to be blocked, it will be seen subsequently that no pulse is applied to the gates 16.

The check of the number of mutations is effected by the checking circuit 61. At the moment 0 in each cycle, all the trigger circuits 611–613 are reset to state zero as regards 611 and 612 and to state one as regards 613. The matrix bar 616 is then positive and the gate 614 open. On each mutation, a pulse is applied to the latter. The counter functions in accordance with the diagrams 611, 612, 613 in FIG. 6.

After four mutations, the bar 617 becomes negative thus closing the gate 615. The pulse applied to this gate at the end of a cycle is then intercepted.

If there have been less than four mutations, the bar 617 is positive, the gate 615 open and the end-of-cycle pulse passing through it reaches the error-signalling trigger circuit 631.

If there have been more than four mutations, the counter continues to function up to a maximum of six pulses. At the count of 6, the bar 616 becomes negative and closes the input gate 614 for the mutations. The counter stops and will be restored to the initial position at the end of the cycle.

The counter 611–612–613 is stopped before it has executed a complete cycle corresponding to eight pulses. Actually, at this count, as at every multiple of four pulses, the bar 617 would wrongly initiate a validity signal through the gate 615.

The parity check is afforded by the trigger circuit 621. Re-set to the initial one position at the zero moment in each cycle, it receives the pulses leaving the trigger circuit 511 of the telegraphic time base through the gate 622. These pulses appear at the moments 20, 40, 60, 80, 100, 120 and 140 ms. of the incoming modulation. On the other hand, the gate 622 is only opened by the trigger circuit 141 at the moment when the incoming polarity is negative. Thus each negative square pulse of a unit interval gives rise, at the output of the gate 622, to a pulse which causes the state of the trigger stage 621 to change. Since this is restored to the one position at the end of each cycle it should be in this same position if the number of pulses received is even, that is to say if the modulation received comprises an even number of negative pulses. In the opposite case, the gate 623 is open and the same pulse which, at the following zero moment will restore the trigger circuit 621 to the one position will first pass through the gate 623 to set the trigger circuit 631.

The error process takes place in the following manner. The gate 632 receives three kinds of pulses, from the gate 623 on every incorrect parity, from the gate 615 when the number of mutations received is other than four and from the gate 633 when an "RQ" signal has been marked.

Every time one of these pulses is applied thereto, the trigger circuit 631 assumes the one position and opens the gate 639. The pulses which are then applied to the latter, during each cycle, at the moment $0+dt$, through the delay circuit 641, 642, 643, cause the counter 635, 636, 637 to advance.

During two consecutive cycles, the trigger circuit 636 in the one position controls the transmission relay 15 in such a manner that the latter transmits a negative current of the same duration over the line 100 to the transmission device. In the case in FIG. 1 where the transmission channel is two-wire, the duration of this error signal is reduced to a unit interval and it is the mutation in the negative direction over the return channel which marks the beginning of the error signalling.

At the end of 5 cycles, the trigger circuit 637 changes to the zero position and opens the gate 640. On the other hand, on detection of the RQ signal, the trigger circuit 634 coming into the one position likewise opens the gate 640 at the zero moment in the reception cycle. The pulse at $0+dt$ which follows immediately restores the trigger circuit 631 to the zero position which opens the output gate 638. At the following moment $0+dt$, the first combination will be put out.

In the case where the RQ signal has not been detected, the gate 640 remains closed, the trigger circuit 631 remains in the one position and the counter 635, 636, 637 effects a fresh cycle, transmitting a fresh error signal.

In the event of an improper RQ signal being received during a blocking cycle, it merely duplicates the RQ signal normally received and does not disturb the repetition process.

What I claim is:

1. A data-transmission system for transmitting binary digit characters in which the number of the digits of a given binary value has a predetermined parity and the number of transitions from one binary value to the other is a predetermined number comprising a transmission device and a reception device interconnected by a transmission channel, said reception device comprising first means for checking in each character said predetermined number of transitions and for generating a first signal in response to the number checking operation, second means for checking the predetermined parity of the number of digits and for generating a second signal in response to the parity checking operation and means for transmitting over said transmission channel an error signal in response to at least one signal out of said first and second signals and said transmission device comprising means for storing a given number of the last characters transmitted, means for detecting the error signals originating from the receiving device and means for retransmitting the stored characters in response to each error signal.

2. A data-transmission system for transmitting binary digit characters in which the number of the digits of a given binary value has a predetermined parity and the number of transitions from one binary value to the other is a predetermined number comprising a transmission device and a reception device interconnected by a transmission channel, said reception device comprising first means for checking in each character said predetermined number of transitions and for generating a first signal in response to the number checking operation, second means for checking the predetermined parity of the number of digits and for generating a second signal in response to the parity checking operation and means for transmitting over said transmission channel an error signal in response to at least one signal out of said first and second signals and said transmission device comprising means for storing a given number of the last characters transmitted, means for detecting the error signals originating from the receiving device, means for retransmitting the stored characters preceded by a retransmission function character in response to each error signal, and means for inhibiting said error signal detecting means during the retransmission of the stored and function characters.

3. A data-transmission system for transmitting binary digit characters in which the number of the digits of a given binary value has a predetermined parity and the number of transitions from one binary value to the other is a predetermined number comprising a transmission device and a reception device interconnected by a transmission channel, said reception device comprising first means for checking in each character said predetermined number of transitions and for generating a first signal in response to the number checking operation, second means for checking the predetermined parity of the number of digits and for generating a second signal in response to the parity checking operation, means for transmitting over said transmission channel an error signal in response to at least one signal out of said first and second signals, a data collector for said characters and access means to said data collector, said transmission device comprising means for storing a given number N of the last characters transmitted, means for detecting the error signals originating from the receiving device and means for retransmitting the stored characters preceded by a retransmission function character in response to each error signal, said reception device further comprising means for closing said access means in response to at least one signal out of said first and second signals and means for re-opening said access means in response to the retransmission function character with a delay equal to the duration of said N retransmitted characters.

4. A data-transmission system as set forth in claim 1, wherein the binary digit characters to be transmitted comprise seven digits among which the number of digits of a given binary value is even, and the number of transitions from one binary value to the other is equal to four.

References Cited

UNITED STATES PATENTS 2,995,626   8/1961   Van Duuren ____ 340—146.1 X

MALCOLM A. MORRISON, Primary Examiner

R. STEPHEN DILDINE, JR., Assistant Examiner

U.S. Cl. X.R.

325—41